US011257485B2

(12) United States Patent
Li et al.

(10) Patent No.: US 11,257,485 B2
(45) Date of Patent: *Feb. 22, 2022

(54) ADAPTIVE AUDIO ENHANCEMENT FOR MULTICHANNEL SPEECH RECOGNITION

(71) Applicant: Google LLC, Mountain View, CA (US)

(72) Inventors: Bo Li, Fremont, CA (US); Ron J. Weiss, New York, NY (US); Michiel A. U. Bacchiani, Summit, NJ (US); Tara N. Sainath, Jersey City, NJ (US); Kevin William Wilson, Cambridge, MA (US)

(73) Assignee: Google LLC, Mountain View, CA (US)

( * ) Notice: Subject to any disclaimer, the term of this patent is extended or adjusted under 35 U.S.C. 154(b) by 174 days.

This patent is subject to a terminal disclaimer.

(21) Appl. No.: 16/708,930

(22) Filed: Dec. 10, 2019

(65) Prior Publication Data
US 2020/0118553 A1   Apr. 16, 2020

Related U.S. Application Data

(63) Continuation of application No. 15/848,829, filed on Dec. 20, 2017, now Pat. No. 10,515,626, which is a
(Continued)

(51) Int. Cl.
*G10L 15/00* (2013.01)
*G10L 15/16* (2006.01)
(Continued)

(52) U.S. Cl.
CPC ............. *G10L 15/16* (2013.01); *G10L 15/20* (2013.01); *G10L 21/0224* (2013.01); *G10L 15/26* (2013.01); *G10L 2021/02166* (2013.01)

(58) Field of Classification Search
CPC ................................ G10L 15/16; G10L 15/34
See application file for complete search history.

(56) References Cited

U.S. PATENT DOCUMENTS 6,041,299 A    3/2000  Schuster
6,202,049 B1   3/2001  Kibre et al.
(Continued)

FOREIGN PATENT DOCUMENTS

CN    103811010 A    5/2014
EP       1450350      8/2004
(Continued)

OTHER PUBLICATIONS

Allen et al. "Image Method for Efficiently Simulation Room-Small Acoustics," Journal of the Acoustical Society of America, Apr. 1979, vol. 65, No. 4, pp. 943-950.
(Continued)

*Primary Examiner* — Daniel Abebe
(74) *Attorney, Agent, or Firm* — Honigman LLP; Brett A. Krueger; Grant Griffith

(57) ABSTRACT

Methods, systems, and apparatus, including computer programs encoded on a computer storage medium, for neural network adaptive beamforming for multichannel speech recognition are disclosed. In one aspect, a method includes the actions of receiving a first channel of audio data corresponding to an utterance and a second channel of audio data corresponding to the utterance. The actions further include generating a first set of filter parameters for a first filter based on the first channel of audio data and the second channel of audio data and a second set of filter parameters for a second filter based on the first channel of audio data and the second channel of audio data. The actions further include generating a single combined channel of audio data. The actions further include inputting the audio data to a neural network. The actions further include providing a transcription for the utterance.

20 Claims, 5 Drawing Sheets

Related U.S. Application Data continuation of application No. 15/392,122, filed on Dec. 28, 2016, now Pat. No. 9,886,949.

(60) Provisional application No. 62/312,053, filed on Mar. 23, 2016.

(51) Int. Cl.
*G10L 15/20* (2006.01)
*G10L 21/0224* (2013.01)
*G10L 15/26* (2006.01)
*G10L 21/0216* (2013.01)

(56) References Cited

U.S. PATENT DOCUMENTS

| | | | |
|---|---|---|---|
| 9,239,828 B2 | 1/2016 | Yao et al. | |
| 9,263,036 B1 | 2/2016 | Graves | |
| 9,269,350 B2* | 2/2016 | Schuster | G10L 15/08 |
| 9,368,110 B1 | 6/2016 | Hershey et al. | |
| 9,390,712 B2 | 7/2016 | Yu | |
| 9,477,895 B2 | 10/2016 | Hershey et al. | |
| 9,582,753 B2 | 2/2017 | Hershey et al. | |
| 9,697,826 B2 | 7/2017 | Sainath | |
| 9,842,106 B2 | 12/2017 | Hori et al. | |
| 2014/0350926 A1* | 11/2014 | Schuster | G10L 15/26 704/233 |
| 2014/0372120 A1 | 12/2014 | Harsham et al. | |
| 2014/0372122 A1 | 12/2014 | Harsham et al. | |
| 2015/0039301 A1 | 2/2015 | Senior et al. | |
| 2015/0066496 A1 | 3/2015 | Deoras | |
| 2015/0095026 A1 | 4/2015 | Bisani et al. | |
| 2015/0170640 A1 | 6/2015 | Sak et al. | |
| 2015/0228277 A1 | 8/2015 | Anhari | |
| 2015/0269933 A1 | 9/2015 | Yu et al. | |
| 2015/0356401 A1 | 12/2015 | Vinyals | |
| 2016/0111107 A1 | 4/2016 | Erdogan et al. | |
| 2016/0111108 A1 | 4/2016 | Erdogan et al. | |
| 2016/0322055 A1 | 11/2016 | Sainath | |
| 2016/0358619 A1 | 12/2016 | Ramprashad | |
| 2017/0221474 A1 | 8/2017 | Hori et al. | |
| 2018/0197534 A1* | 7/2018 | Li | G10L 15/20 |

FOREIGN PATENT DOCUMENTS

| | | |
|---|---|---|
| RU | 2418321 | 5/2011 |
| WO | WO 2016013685 | 1/2016 |

OTHER PUBLICATIONS

Barker et al. "The third CHiME' Speech Separation and Recognition Challenge: Dataset, task and baselines," in Proc. ASRU. IEEE, 2015, pp. 504-511.
Bengio et al. "Scheduled Sampling for sequence prediction with recurrent neural networks," in Proc. NIPS, 2015, pp. 1171-1179.
Brandstein et al. "Microphone arrays: signal processing techniques and applications," Springer Science & Business Media, 2013, 9 pages.
Chen et al. "Speech enhancement and recognition using multi-task learning of long short term memory recurrent neural networks," in Proc. Interspeech. ISCA, 2015, pp. 3274-3278.
Chung et al. "Gated feedback recurrent neural networks," arXiv preprint arXiv, 2015, 1502.02367 9 pages.
CN Office Action issued in Chinese Application No. 201680079040. 7, dated Feb. 27, 2019, 10 pages (English translation).
Dean et al. "Large Scale Distributed Deep Networks," in Proc. NIPS, 2012, pp. 1223-1231.
DiBiase et al. "Robust localization in reverberant rooms," in Microphone Arrays. Springer, 2001, pp. 157-180.
EP Office Action in European Appln. No. 16826635.1, dated Jul. 19, 2019, 6 pages.
Giri et al. "Improving speech recognition in reverberation using a room-aware deep neural network and multi-task learning," in Proc. ICASSP. IEEE, 2015, pp. 5014-5018.
Glorot et al. "Understanding the Difficulty of Training Deep Feedforward Neural Networks," in Proc. AISTATS, 2010, pp. 249-256.
Heigold et al. "Asynchronous Stochastic Optimization for Sequence Training of Deep Neural Networks," in Proc. ICASSP. IEEE, 2014, pp. 5587-5591.
Hinton et al. "Deep Neural Networks for Acoustic Modeling in Speech Recognition," IEEE Signal Processing Magazine, 2012, vol. 29, No. 6, 27 pages.
Hori et al. "The MERL/SRI system for the 3rd CHiME challenge using beamforming, robust feature extraction, and advanced speech recognition," in Proc. ASRU. IEEE, 2015, pp. 475-481.
Hoshen et al. "Speech Acoustic Modeling from Raw Multichannel Waveforms," Proc. ICASSP. IEEE, 2015, 5 pages.
International Preliminary Report on Patentability issued in International Application No. PCT/US2016/068800, dated Oct. 4, 2018, 9 pages.
International Search Report and Written Opinion issued in International Application No. PCT/US2016?068800, dated Feb. 27, 2017, 13 pages.
Knapp et al. "The generalized correlation method for estimation of time delay," Acoustics, Speech and Signal Processing, IEEE Transactions on, 1976, vol. 24., No. 4, pp. 320-327.
Li et al. "An overview of noise-robust automatic speech recognition," Audio, Speech, and Language Processing, IEEE/ACM Transactions on, 2014, vol. 22, No. 4, pp. 745-777.
Li et al. "Neural Network Adaptive Beamforming for Robust Multichannel Speech Recognition," Proc. Interspeech, 2016, 5 pages.
RU Office Action issued in Russian Application No. 2018125957, dated Mar. 4, 2019, 4 pages (English translation).
Sainath et al. "Convolutional, long short-term memory, fully connected deep neural networks," in Proc. ICASSP. IEEE, 2015, pp. 4580-4584.
Sainath et al. "Factored Spatial and Spectral Multichannel Raw Waveform CLDNNs," in Proc. ICASSP. IEEE, 2016, 5 pages.
Sainath et al. "Learning the Speech Front-end with Raw Waveform CLDNNs," in Proc. Interspeech. ISCA, 2015, pp. 1-5.
Sainath et al. "Low-Rank Matrix Factorization for Deep Neural Network Training with High-Dimensional Output Targets," in Proc. ICASSP. IEEE, 2013, pp. 6655-6659.
Sainath et al. "Speaker Localization and Microphone Spacing Invariant Acoustic Modeling from Raw Multichannel Waveforms," in Proc. ASRU. IEEE, 2015, pp. 30-36.
Sainath. "Towards End-to-End Speech Recognition Using Deep Neural Networks," PowerPoint presentation, Deep Learning Workshop, ICML, Jul. 10, 2015, 51 pages.
Seltzer et al. "Likelihood-maximizing beamforming for robust hands-free speech recognition," Speech and Audio Processing, IEEE Transactions on, 2004, vol. 12, No. 5, pp. 489-498.
Swietojanski et al. "Hybrid acoustic models for distant and multichannel large vocabulary speech recognition," in Proc. ASRU. IEEE, 2013, pp. 285-290.
Van Veen et al. "Beamforming: A Versatile Approach to Spatial Filtering," IEEE ASSP magazine, 1988, vol. 5, No. 2, pp. 4-24.
Variani et al. "Complex Linear Projection (CLP): A Discriminative Approach to Joint Feature Extraction and Acoustic Modeling," in Proc. ICML, 2016, 5 pages.
Warsitz et al. "Acoustic filter-and-sum beamforming by adaptive principal component analysis," in Proc.ICASSP, IEEE, 2005, vol. 4, pp. 797-800.
Weng et al. "Recurrent deep neural networks for robust speech recognition," in Proc. ICASSP. IEEE, 2014, 7 pages.
Weng et al. "Single-Channel Mixed Speech Recognition using Depp Neural Networks," Proceedings of the 2014 IEEE International Conference on Acoustics, Speech and Signal Processing, May 2014, 5 pages.
Xiao et al. "A learning-based approach to direction of arrival estimation in noisy and reverberant environments," in Proc. ICASSP. IEEE, 2015, pp. 2814-2818.
Xiao et al. "Deep beamforming networks for multi-channel speech recognition," in Proc. ICASSP. IEEE, Mar. 20, 2016, 7 pages.

(56) References Cited

OTHER PUBLICATIONS

Zhang et al. "Extracting deep neural network bottleneck features using low-rank matrix factorization." in Proc. ICASSP, 2014, pp. 185-189.

* cited by examiner

ADAPTIVE AUDIO ENHANCEMENT FOR MULTICHANNEL SPEECH RECOGNITION

CROSS-REFERENCE TO RELATED APPLICATION

This application is a continuation of U.S. patent application Ser. No. 15/848,829, filed on Dec. 20, 2017, which is a continuation of U.S. patent application Ser. No. 15/392,122, filed on Dec. 28, 2016, which claims the benefit of U.S. Patent Application Ser. No. 62/312,053, filed on Mar. 23, 2016, the contents of which are incorporated by reference.

FIELD

This application relates to processing multi-channel audio waveforms.

BACKGROUND

Various techniques can be used to recognize speech. Some techniques use an acoustic model that receives acoustic features derived from audio data.

SUMMARY

In some implementations, a speech recognition system can perform adaptive audio enhancement techniques to improve multi-channel speech recognition. For example, adaptive beamforming can be performed using neural networks. Multiple channels of audio, e.g., audio information from different microphones, can be provided to a neural network module that adaptively changes the filters used to perform audio enhancement, e.g., spatial filtering or beamforming. In some implementations, the system can dynamically estimate a set of filters for each input frame using the neural network. For example, raw-waveform multi-channel signals can be passed to a filter prediction (FP) long short-term memory (LSTM) module to generate time-domain filters for each channel. These filters are then convolved with the audio data for the respective channels and summed together to form single channel enhanced speech, which is provided to an acoustic model used to perform speech recognition.

While some automated speech recognition (ASR) systems may perform reasonably in some situations, such as when a user is near aa microphone, performance of such ASR systems may degrade in far-field conditions where there is large distances between the user and the microphone, e.g., when a speaker is providing commands to a television or a thermostat. In such conditions, speech signals are subject to degradation due to reverberation and additive noise. These systems often use multiple microphones to improve recognition accuracy, enhance speech signals, and reduce effects due to reverberation and noise.

Some multi-channel ASR systems utilize two separate modules to perform recognition. First, a microphone array speech enhancement is applied, typically via beamforming. The enhanced signal is then passed to an acoustic model. Techniques often include delay-and-sum beamforming, which involves receiving signals from different microphones to adjust for the delay from the target speaker to each of the microphones. The time-aligned signals are then summed to enhance the signal from the target direction and attenuate noise coming from other directions. Other forms of signal enhancement include Minimum Variance Distortionless Response (MVDR), and Multichannel Wiener Filtering (MWF).

The approach of treating enhancement as disjoint from acoustic modeling might not lead to the best solution for improving ASR performance. In addition, many enhancement techniques involve a model-based approach that requires an iterative parameter optimization for an acoustic model and/or audio enhancement model. For example, the approaches often first estimate beamforming parameters and then estimate acoustic model parameters. These iterative approaches are not easily combined with other types of models that do not use iterative training. For example, acoustic models based on neural networks are often optimized using a gradient learning algorithm rather than the iterative training techniques used with Gaussian Mixture Models (GMMs) and other models.

A speech recognition system can be enhanced by jointly learning spatial filters and acoustic model parameters. One technique for performing audio enhancement uses multi-channel "time convolution" filters, each of which independently filters each channel of the input and then sums the outputs in a process analogous to filter-and-sum beamforming. Other techniques can learn multiple spatial filters to adapt to the target signal arriving at different spatial directions, at a large increase in computational complexity. While both of these methods have shown improvements over traditional delay-and-sum and filter-and-sum signal processing techniques, one drawback is that estimated spatial and spectral filters determined during training are fixed for decoding. That is, the filters do not change or adapt during use in speech recognition. As a result, with fixed-filter approaches, the fixed filters may not be appropriate for the actual position of a user relative to the microphones.

Accordingly, an innovative aspect of the subject matter described in this application relates to an automated speech recognition system that can adapt the filters used for audio enhancement as speech data is received. For example, as speech is detected, the speech recognition system can dynamically vary the parameters of filters used to perform spatial filtering. In some implementations, the filters are adapted for each input speech frame. Also, each filter can be determined using information about multiple channels of audio. Rather than determining each filter being determined independently based on a single audio channel, the filter for each audio channel can be determined using the inputs from all of the audio channels.

A speech recognition system can perform adaptive audio enhancement using one or more neural networks. For example, a speech recognition may include two neural networks, one that adaptively generates spatial filters and another that acts as an acoustic model. The first neural network generates filter parameters based on multiple channels of audio data corresponding to an utterance. The filter parameters specify the characteristics multiple filters, e.g., one filter for each channel of audio data. The filter parameters for each channel are provided to a different filter. Each filter is then applied to its corresponding channel of audio data, and the results for each channel are summed together. The summed filter outputs are provided to the second neural network that has been previously trained to identify the acoustic phonemes of the utterance. The system can then use the identified phonemes to generate a compete transcription of the utterance.

According to an innovative aspect of the subject matter described in this application, a method of adaptive audio enhancement for multichannel speech recognition includes the actions of receiving a first channel of audio data corresponding to an utterance and a second channel of audio data corresponding to the utterance; generating, using a trained recurrent neural network, (i) a first set of filter parameters for a first filter based on the first channel of audio data and the second channel of audio data and (ii) a second set of filter parameters for a second filter based on the first channel of audio data and the second channel of audio data; generating a single combined channel of audio data by combining (i) audio data of the first channel that has been filtered using the first filter and (ii) audio data of the second channel that has been filtered using the second filter; inputting the audio data for the single combined channel to a neural network trained as an acoustic model; and providing a transcription for the utterance that is determined based at least on output that the neural network provides in response to receiving the combined convolution outputs.

This and other implementations may include one or more of the following optional features. The recurrent neural network comprises one or more long short-term memory layers. The recurrent neural network includes a first long short-term memory layer that receives both first and second channels of audio; and a second long short-term memory layer corresponding to the first channel and a third long short-term memory layer corresponding to the second channel, the second long short-term memory layer and the third long short-term memory layer each receiving the output of the first long short-term memory layer and providing a set of filter parameters for the corresponding channel. The long short-term memory layer layers have parameters that have been learned during a training process that jointly trains the long short-term memory layers and the neural network that is trained as an acoustic model. The actions further include changing, or generating, new filter parameters for each input frame of audio data. The actions further include for each audio frame in a sequence of audio frames of the utterance, generating and a new set of filter parameters and convolving audio data for the frame with a filter with the new set of filter parameters. The first filter and the second filter are finite impulse response filters. The first filter and the second filter have different parameters.

Different microphone outputs are convolved with different filters. The first and second channels of audio data are first and second channels of audio waveform data for the utterance. The first and second channels of audio waveform are recordings of the utterance by different microphones that are spaced apart from each other. The neural network trained as an acoustic model comprises a convolutional layer, one or more long-short term memory layers, and multiple hidden layers. The convolutional layer of the neural network trained as an acoustic model is configured to perform a time domain convolution. The neural network trained as an acoustic model is configured such that output of the convolutional layer is pooled to generate a set of pooled values. The neural network trained as an acoustic model is configured to input the pooled values to one or more long-short term memory layers within the neural network trained as an acoustic model. The first and second filters are configured to perform both spatial and spectral filtering. The actions further include convolving the audio data for the first channel with a first filter having the first set of filter parameters to generate first convolution outputs; convolving the audio data for the second channel with a second filter having the second set of filter parameters to generate second convolution outputs; and combining the first convolution outputs and the second convolution outputs.

Other embodiments of this aspect include corresponding systems, apparatus, and computer programs recorded on computer storage devices, each configured to perform the operations of the methods.

In some implementations, the techniques described herein can be implemented to realize one or more of the following advantages. For example, a speech recognition system can dynamically alter the filter parameters used for audio enhancement, which can result in greater robustness and accuracy in speech recognition. Improved audio enhancement, as discussed herein, can provide clearer speech data to an acoustic model, allowing for increased speech recognition accuracy. The speech recognition system can generate filters that correspond to the actual position of the user more accurately than fixed, predetermined filters. Additionally, the adaptation of filters may adjust for changes in the position of the user relative to microphones, for example, as the user walks around the room while speaking. In some implementations, the computational complexity of audio enhancement is reduced using the neural network system below, when compared to models that attempt to adapt to signals arriving from multiple different predetermined spatial directions. Improved speech recognition accuracy can also be obtained through other techniques discussed below, including the joint training of a filter prediction model with an acoustic model, training the filter prediction model using feedback from the acoustic model. In some implementations, multi-task learning strategies are used to set multiple training objectives, such as accurate prediction of both acoustic model states and clean audio features. The use of multi-task learning can improve accuracy for recognizing noisy audio, and can also improve filter prediction and regularize training.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference numbers represent corresponding parts throughout.

DETAILED DESCRIPTION

Figure 1:
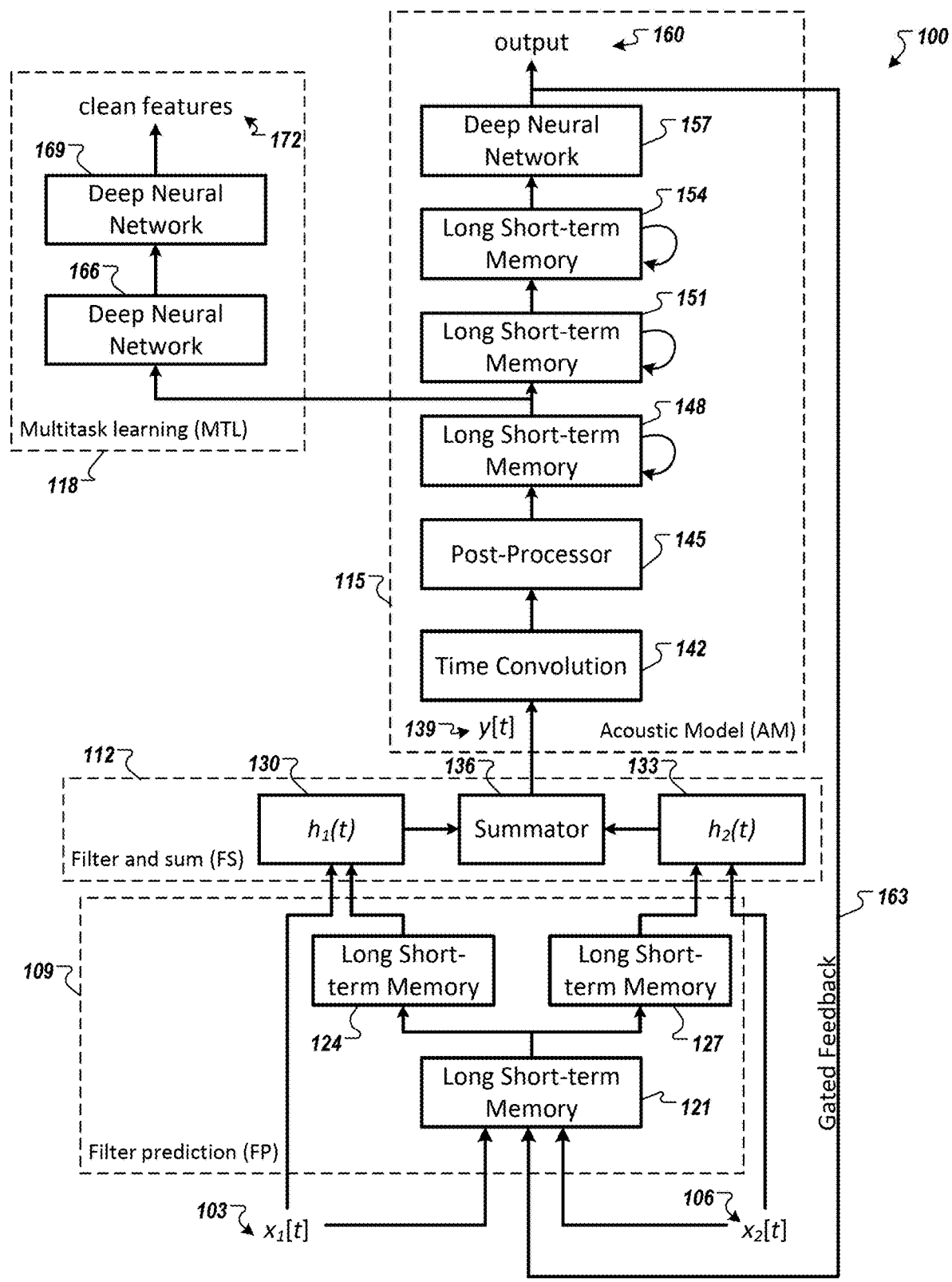
FIG. 1 illustrates an example architecture for adaptive audio enhancement.

Joint multichannel enhancement and acoustic modeling using neural networks may be used to perform speech recognition. In some previous approaches, filters learned during training were fixed for decoding, potentially affecting the ability of these models to adapt to previously unseen or changing conditions. The subject matter described in this application describes a neural network adaptive beamforming (NAB) technique to address this issue. Instead of learning specific filters during a training phase, a neural network model can be trained to dynamically generate filter parameters as audio data is received during speech recognition.

This allows the system to perform more accurate beamforming that is not limited to a predetermined number of fixed signal arrival directions.

In some implementations, a speech recognition system uses long short-term memory (LSTM) layers to predict time-domain beamforming filter coefficients at each input frame. The filters are convolved with the framed time domain input signal and summed across channels, essentially performing finite impulse response (FIR) filter-and-sum beamforming using the dynamically adapted filters. The beamformer output is passed to a convolutional, long short-term memory deep neural network (CLDNN) acoustic model which is trained jointly with the filter prediction LSTM layers. In one example, a speech recognition system with the proposed NAB model achieves a 12.7% relative improvement in word error rate (WER) over a single-channel model and reaches similar performance to a "factored" model architecture which utilizes several fixed spatial filters, with a 17.9% decrease in computational cost.

While automatic speech recognition (ASR) performance has improved dramatically in recent years, particularly with the advent of deep learning, performance in realistic noisy and far-field scenarios is still far-behind clean speech conditions. To improve robustness, microphone arrays are commonly utilized to enhance the speech signal and eliminate unwanted noise and reverberation.

A speech recognition system may use multichannel signal processing technique is delay-and-sum (DS) beamforming, in which signals from different microphones are aligned in time to adjust for the propagation delay from the target speaker to each microphone, and then mixed to a single channel. This has the effect of enhancing the signal from the target direction and attenuating noise coming from other directions. However, it may difficult to accurately estimate the time delay of arrival in reverberant environments and DS beamforming does not take into account the effect of spatially correlated noise. It is possible to improve performance using the more general filter-and-sum (FS) technique, where a linear filter is applied to each channel before summing. Such filters are commonly chosen to optimize signal level objectives such as SNR, which differ from the acoustic model (AM) training objective.

Joint training of enhancement and AM stages improves performance, both for Gaussian mixture model and neural network acoustic models. For example, in some implementations, a speech recognition system may train neural networks to operate directly on multichannel waveforms using a single layer of multichannel "time convolution" FIR filters, each of which independently filters each channel of the input and then sums the outputs in a process analogous to FS beamforming. After training, the filters in this multichannel filterbank learn to jointly perform spatial and spectral filtering, with typical filters having a bandpass response in frequency, but steered to enhance or attenuate signals arriving from different directions. In some implementations, a speech recognition system may use a factored multichannel waveform model that separates the spatial and spectral filtering behavior into separate layers, and improves performance, but may increase computational complexity. While both of these architectures have shown improvements over traditional DS and FS signal processing techniques, one drawback is that the estimated spatial and spectral filters are fixed during decoding.

To address the limited adaptability and reduce the computational complexity of the models described above, the subject matter described in this application includes a neural network adaptive beamforming (NAB) model which re-estimates a set of spatial filter coefficients at each input frame using a neural network. Specifically, raw multichannel waveform signals are passed into a filter prediction (FP) LSTM whose outputs are used as spatial filter coefficients. These spatial filters for each channel are then convolved with the corresponding waveform input, and the outputs are summed together to form a single-channel output waveform containing the enhanced speech signal. The resulting single channel signal is passed to a raw waveform acoustic model, which is trained jointly with the FP LSTM layers. In some implementations, filtering may be performed in the frequency domain, as opposed to processing time domain signals. This disclosure illustrates below that performing NAB in the time domain requires estimation of many fewer filter coefficients, and results in better WER compared to frequency domain filter prediction.

In addition, the subject matter described in this application includes other improvements to the NAB model. First, the disclosure describes explicitly feeding activations of the upper layers of the acoustic model from the previous time step, which capture high-level information about the acoustic states, as an additional input to the FP layers. A gating mechanism is further adopted to attenuate the potential errors in these predictions. It analyzes the predictions together with inputs and model states to output a confidence score that scales down the feedback vectors when necessary. Second, the disclosure describes incorporating a multitask learning (MTL) strategy to regularize training and aid in filter prediction. This works by training the NAB model to jointly predict acoustic model states and clean features, which may improve acoustic models trained on noisy data.

An example of a neural network adaptive beamforming (NAB) model is depicted in FIG. 1, which includes filter prediction (FP), filter-and-sum (FS) beamforming, acoustic modeling (AM) and multitask learning (MTL) blocks. Two channels are shown, but a greater number of channels may be used. At each time frame k, the system takes in a small window of M waveform samples for each channel c from the C channel inputs, denoted as $x_1(k)[t], \ldots, x_c(k)[t]$ for $t \in \{1, \ldots, M\}$.

Adaptive spatial filtering can be performed as follows. A finite impulse response (FIR) filter-and-sum beamformer can be written as:

$$y(t) = \sum_{c=0}^{C-1} \sum_{n=0}^{N-1} h_c[n] x_c[t - n - \tau_c] \quad \text{Equation 1}$$

where $h_c[n]$ is the n-th tap of the filter associated with microphone c, $x_c[t]$ is the signal received by microphone c at time t, $T_c$ is the steering delay induced in the signal received by a microphone to align it to the other array channels, and y[t] is the output signal. N is the length of the filter.

Enhancement algorithms that optimize Equation 1 may require an estimate of the steering delay $T_c$, which may be obtained from a separate localization model. The filter coefficients may be obtained by optimizing signal-level objectives. In the NAB model, the system estimates the filter coefficients jointly with the AM parameters by directly minimizing a cross-entropy or sequence loss function. Instead of explicitly estimating the steering delay for each microphone, $T_c$ can be implicitly absorbed into the estimated filter coefficients. The resulting adaptive filtering at each time frame k is given by Equation 2, where $h_c(k)[t]$ is the estimated filter for channel c at time frame k.

$$\sum_{c=0}^{C-1} \sum_{n=0}^{N-1} h_c(k)[n] x_c(k)[t-n] \qquad \text{Equation 2}$$

In order to estimate $h_c(k)[t]$, the system trains an FP LSTM to predict N filter coefficients per channel. The input to the FP module is a concatenation of frames of raw input samples $x_c(k)[t]$ from all the channels, and can also include features for localization such as cross correlation features.

The disclosure below describes the FP module architecture in more detail. Following Equation 2, the estimated filter coefficients $h_c(k)[t]$ are convolved with input samples $x_c(k)[t]$ for each channel. The outputs of the convolution are summed, e.g., in the FS block, across channels to produce a single channel signal $y(k)[t]$.

Acoustic Modeling is then performed using the AM block. The single channel enhanced signal $y(k)[t]$ is passed to the AM module shown in FIG. 1. The single channel waveform is passed into a "time convolution" layer, denoted as tConv, which acts as a time-domain filterbank containing a number of filters. For example, 128 filters may be used. The tConv output is decimated in time by max-pooling over the length of the input frame. In some implementations, maxpooling the spectral output in time helps to discard short-time information. Finally, a rectifier non-linearity and stabilized logarithm compression are applied to each filter output, to produce a frame-level feature vector at frame k.

In some implementations, the system does not include a frequency convolution layer. The feature vector generated by the time convolution layer is directly passed to three LSTM layers with 832 cells and a 512-dimensional projection layer, followed by a fully connected DNN layer of 1,024 hidden units. A 512-dimensional linear output low rank projection layer is used prior to the softmax layer to reduce the number of parameters needed to classify the 13,522 context-dependent state output targets used. After processing the frame k, the system shift the window of the overall input signal by a 10 ms hop and repeat this process.

The AM and FP modules can be trained jointly. In some implementations, the FS block has no trainable parameters. The model is unrolled 20 time steps for training using truncated back-propagation through time. The output state label is delayed by 5 frames, since using information about future frames often improves the prediction of the current frame.

The training process can be enhanced using gated feedback. Recognition information from acoustic model reflects the content of speech and is believed to help earlier layers of the network. Augmenting the network input at each frame with the prediction from the previous frame can improve performance. To investigate the benefit of feedback in the NAB model, the AM prediction at frame k-1 can be passed back to the FP model at time frame k (right-most vertical line in FIG. 1). Since the softmax prediction is very high dimensional, the system feeds back the low-rank activations preceding the softmax to the FP module to limit the increase of model parameters.

This feedback connection gives the FP module high level information about the phonemic content of the signal to aid in estimating beamforming filter coefficients. For example, the connection can provide probable context-dependent state information in the signal for use while generating beamforming filters. This feedback is comprised of model predictions which may contain errors, however, particularly early in training, and therefore might lead to poor model training. A gating mechanism is hence introduced to the connection to modulate the degree of feedback. Unlike conventional LSTM gates, which control each dimension independently, we use a global scalar gate to moderate the feedback. The gate $g^{fb}(k)$ at time frame k, is computed from the input waveform samples $x(k)$, the state of the first FP LSTM layer $s(k-1)$, and the feedback vector $v(k-1)$, as follows:

$$g^{fb}(k) = \sigma(w_x^T \cdot x(k) + w_s^T \cdot s(k-1) + w_v^T \cdot v(k-1)) \qquad \text{Equation 3}$$

where $w_x$, $w_s$, and $w_v$ are the corresponding weight vectors and $\sigma$ is an elementwise non-linearity. The system uses a logistic function for $\sigma$ which outputs values in the range $[0,1]$, where 0 cuts off the feedback connection and 1 directly passes the feedback through. The effective FP input is hence $[h_x(k), g_{fb}(k)v(k-1)]$.

Multitask learning may yield improved robustness. The system includes an MTL module during training by configuring the network to have two outputs, one recognition output which predicts CD states and a second denoising output which reconstructs 128 log-mel features derived from the underlying clean signal. The denoising output is only used in training to regularize the model parameters; the associated layers are discarded during inference. In the NAB model the MTL module branches off of the first LSTM layer of the AM module, as shown in FIG. 1. The MTL module is composed of two fully connected DNN layers followed by a linear output layer which predicts clean features. During training the gradients back propagated from the two outputs are weighted by $\alpha$ and $1-\alpha$ for the recognition and denoising outputs respectively.

This disclosure describes experiments conducted on about 2,000 hours of noisy training data including of 3 million English utterances. This data set is created by artificially corrupting clean utterances using a room simulator, adding varying degrees of noise and reverberation. The clean utterances are anonymized and hand-transcribed voice search queries, and are representative of internet voice search traffic. Noise signals, which include music and ambient noise sampled from video sharing websites and recordings of "daily life" environments, are added to the clean utterances at SNRs ranging from 0 to 20 dB, with an average of about 12 dB. Reverberation is simulated using an image model with room dimensions and microphone array positions that are randomly sampled from 100 possible room configurations with T60s ranging from 400 to 900 ms, with an average of about 600 ms. The first and last channel of an 8-channel linear microphone array are used, which has a microphone spacing of 14 cm. Both noise and target speaker locations vary across utterances; the distance between the sound source and the microphone array is chosen between 1 to 4 meters. The speech and noise azimuths were uniformly sampled from the range of ±45 degrees and ±90 degrees, respectively, for each noisy utterance. The variation in noise and speaker locations can assist to improve robustness of the system.

The evaluation set includes a separate set of about 30,000 utterances (over 200 hours). It is created similarly to the training set under similar SNR and reverberation settings. In some implementations, the room configurations, SNR values, T60 times, and target speaker and noise positions in the evaluation set are not identical to those in the training set, although the microphone array geometry between the training and test sets is sometimes identical.

Input features for raw waveform models are computed using an input window size of 35 ms, with a 10 ms hop between frames. Unless otherwise indicated, all networks are trained with 128 tConv filters and with the cross-entropy criterion, using asynchronous stochastic gradient descent (ASGD). The sequence-training experiments may also use distributed ASGD, which is outlined in more details in [29]. All networks have 13,522 CD output targets. The weights for CNN and DNN layers are initialized using the Glorot-Bengio strategy, while all LSTM parameters are uniformly initialized to lie between −0.02 and 0.02. We use an exponentially decaying learning rate, which starts at 4e-3 and has a decay rate of 0.1 over 15 billion frames.

In one example, a baseline NAB model includes a raw waveform CLDNN AM and a FP module, without MTL and feedback. The FP module has two 512-cell LSTM layers and one linear output layer to generate 5 ms filter coefficients (e.g. 81 taps at 16 kHz sampling rate) per input channel. This gives a word error rate (WER) of 22.2%, while the single-channel raw waveform CLDNN is at 23.5%. The following sections describe experiments using variations of this baseline to find an improved FP setup.

Several different architectures can be used for the FP module (e.g., FIG. 1). Each FP module has first S "shared" 512-cell LSTM layers, followed by a split stack of P "split" channel-dependent 256-cell LSTM layers, to encourage learning an independent filter prediction model for each channel. Channel-dependent linear output layers are then added to generate filter coefficients. The baseline hence has S=2 and P=0.

Improved performance may be obtained using one shared and one channel-dependent LSTM layer. In some implementations, further increasing the total number of LSTM layers may not improve performance, regardless of the configuration.

Cross-correlation features may be used for localization, and may be used to predict frequency domain beamforming filters. As a result, these cross-correlation features can be provided to the FP block. For comparison, a two-channel NAB model passing the unweighted cross correlation features extracted from 100 ms frames with 10 ms shift as inputs to the FP module is also trained. With the same baseline structure (S=2, P=0), this model gave a WER of 22.3%, which is similar to the 22.2% obtained using waveform samples as inputs. Providing more explicit localization information in the form of cross correlation features does not help, suggesting that the FP module is able to learn good spatial filters directly from waveform samples.

The maximum delay between two microphones spaced 14 cm apart may be less than 0.5 ms, suggesting that filters no shorter than 0.5 ms should be sufficient to align the two channels. This section describes varying the length of predicted filters with the baseline FP module (S=2 and P=0). Improved performance may be obtained using a 1.5 ms filter. It can also be seen that making the filter size too large hurts performance.

The NAB model can use multitask learning to improve robustness by training part of the network to reconstruct 128 dimensional clean log-mel features as a secondary objective to the primary task of CD state prediction. An interpolation weight α=0.9 is used to balance the two objectives. Using MTL, the baseline NAB (S=2, P=0 and 5.0 ms filter) reduces WER from 22.2% to 21.2%. To further improve performance, a gated feedback connection is added which results in another 0.2% absolute reduction to yield a final WER of 21.0%.

Figure 2:
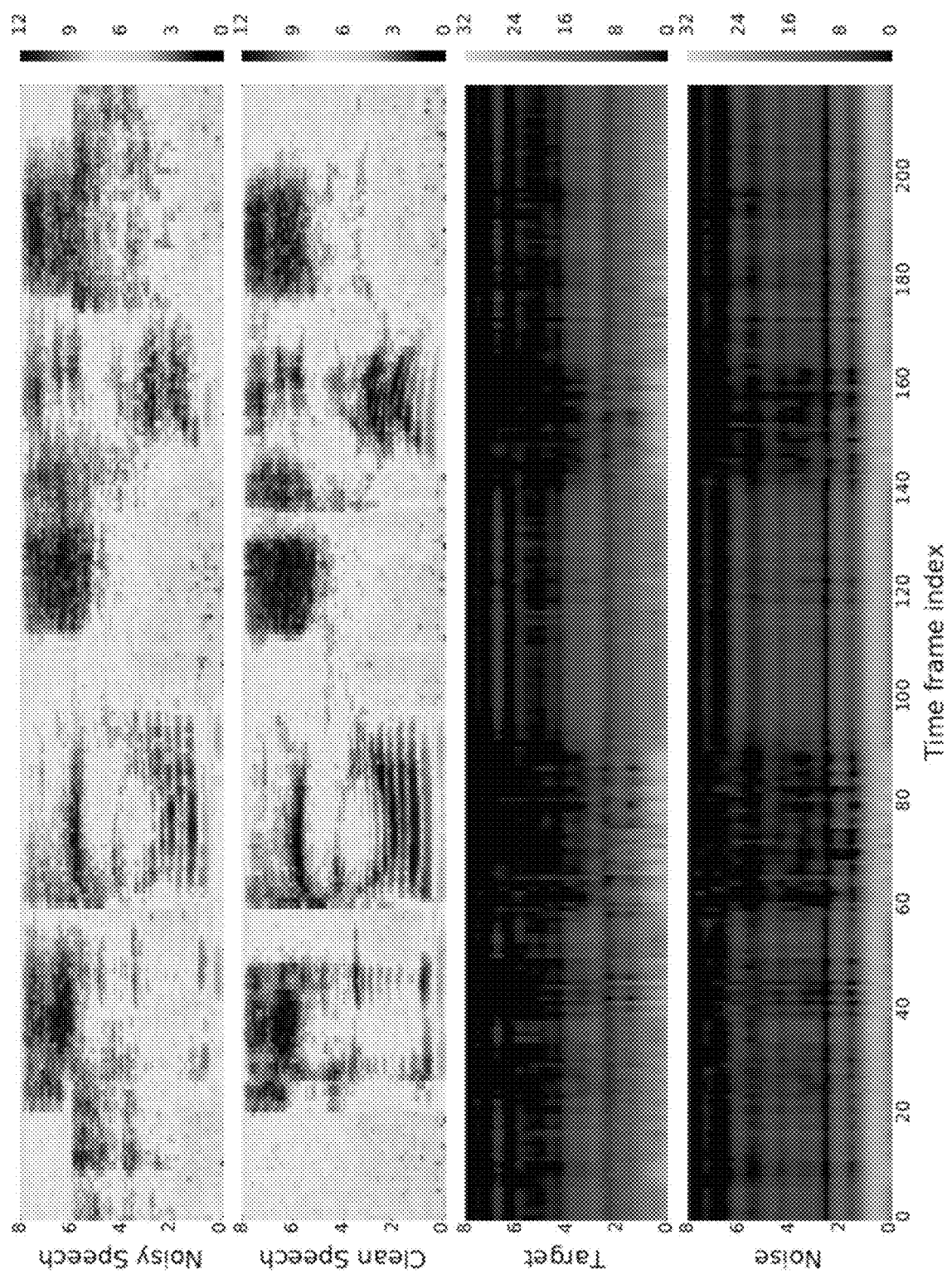
FIG. 2 illustrates example beamformer responses.

A final NAB model with improved configurations has: a) the FP structure of S=1 and P=1; b) raw waveform inputs; c) output filter size of 1.5 ms; d) MTL objective interpolation weight of α=0.9; e) gated feedback connections. Instead of using 128 filters for the spectral filtering layer (tConv in FIG. 1), the system uses 256 filters as it has been shown to give further improvements. With the final configurations, the NAB model achieves a WER of 20.5%, a 7.7% relative improvement over the original NAB model at 22.2% without these modifications. Among them, MTL and gated feedback together give the most error reductions. FIG. 2 illustrates the frequency responses of the predicted beamforming filters at the target speech and interfering noise directions. In other words, FIG. 2 illustrates visualizations of the predicted beamformer responses at different frequency (Y-axis) across time (X-axis) at the target speech direction (3rd) and interfering noise direction (4th) with the noisy (1st) and clean (2nd) speech spectrograms.

The SNR for the utterance in the example of FIG. 2 is 12 dB. The responses in the target speech direction have relatively more speech-dependent variations than those in the noise direction. This may indicate that the predicted filters are attending to the speech signal. Besides, the responses at high speech-energy regions are generally lower than others, which suggests the automatic gain control effect of the predicted filters.

Since adaptive beamforming is sometimes performed in the frequency domain, the use of the NAB model in both time and frequency domains can be considered. In the frequency domain NAB setup, there is an LSTM which predicts complex FFT (CFFT) filters for both channels. Given a 257-pt FFT input, this amounts to predicting 4×257 frequency points for real and imaginary components for 2 channels. After the complex filters are predicted for each channel, element-wise product is done with the FFT of the input for each channel, equivalent to the convolution in Equation 2 in the time domain. The output of this is given to a single channel CLDNN in the frequency domain, which does both spectral decomposition with a complex linear projection (CLP) and acoustic modeling. While using CFFT features greatly reduces computational complexity, the performance may be worse than the raw waveform model in some implementations. This may be because CFFT requires predicting a higher dimensional filter.

The performance of the NAB model may also be compared to unfactored and factored raw waveform models, which have been shown to offer superior performance to single channel models and other signal processing techniques such as DS and FS. Compared to an unfactored model, predicting filters per time frame to handle different spatial directions in the data, as discussed above, can increase performance. While the factored model can potentially handle different directions by enumerating many look directions in the spatial filtering layer, the adaptive model can achieve similar performance with less computational complexity.

As noted above, a NAB architecture for multichannel waveform signals can implement adaptive filter-and-sum beamforming jointly with AM training. Unlike previous systems, the beamforming filters adapt to the current input signal and also account for AM's previous predictions through gated feedback connections. To improve the generalization of the model, MTL can be adopted to regularize the training. Experimental results show that incorporating explicit FS structure is beneficial and the proposed NAB has similar performance to the factored model but with lower computational cost.

Returning to the figures, FIG. 1 illustrates an example system 100 for neural network adaptive beamforming (NAB). Briefly, and as described in more detail below, the system 100 receives multiple channels of audio data 103 and 106 that may be received from different microphones. The system 100 processes the audio data 103 and 106 through a filter prediction stage 109, a filtering and summation stage 112, an acoustic model stage 115, and a multitask learning stage 118 to identify the phonemes of the audio data 103 and 106.

During the filter prediction stage 109, the system 100 receives multiple channels of audio data 103 and 106. While the system 100 shows receiving two audio data channels, the system 100 may receive additional audio channels that would each be processed similarly to the audio data 103 and 106. The filter prediction stage 109 includes two LSTM layers that generate filter parameters for the filter and sum stage 112. The first LSTM layer 121 is shared across the two channels of audio data 103 and 106. The first LSTM layer 121 is used for beamforming and benefits from data from the two channels of audio data 103 and 106. Data from one channel influences the beamforming of the other channel. The second LSTM layer with LSTM layers 124 and 127 are channel-dependent. The LSTM layers 124 and 127 generate parameters that adjust the dimensionality of the subsequent filters.

During the filter and sum stage 112, the system 100 uses two filters 130 and 133 and then sums the outputs from those two filters in the sum mator 136. The filter 130 receives the audio data 103 and filter parameters from the LSTM layer 124. The filter parameters are applied to a filter that is then convolved with the audio data 103. Similarly, the filter 133 receives the audio data 106 and filter parameters from the LSTM layer 127. The filter parameters are applied to a filter that is then convolved with the audio data 106. In some implementations the filters 130 and 133 are finite impulse response filters. In some implementations, the length of the filters 130 and 133 are fixed and may be the same or different from each other. In some implementations, the coefficients of the filters 130 and 133 are based on the parameters received from the LSTM layers 130 and 133. The outputs from the two filters 130 and 133 are summed together in the summator 136. The summator output 139 is provided to the acoustic model layer 115.

During the acoustic model stage 115, the system 100 uses a time convolution layer 142, a post processing layer 145, multiple LSTM layers 148, 151, and 154, and a deep neural network 157. The time convolution layer 142 receives the summator output 139 and cleans and further filters the signal by removing high frequencies. In some implementations, system 100 only preforms time convolution and does not preform frequency convolution. The time convolution layer 142 may include one convolutional layer with a plurality of feature maps. For example, time convolution layer 142 may include 256 feature maps. The pooling strategy associated with time convolution layer 142 may include non-overlapping max pooling and, for instance, with a pooling size of 3.

The output of the time convolution layer 142 is provided to the post processor 145. In some implementations, the post processor 145 max pools the output signal of the time convolution layer 142 over the entire length of the output signal. The post processor 145 then applied a rectified non-linearity, followed by a stabilized logarithm expression to produce a frame level feature vector. During rectification, the post processor 145 replaces negative values with a zero value and retains the positive values. In some implementations, the post processor 145 reduces the dimensionality of the feature vector. Reducing the dimensionality reduces the need for additional subsequent LSTM layers.

The output of the post processor 145 is passed to LSTM layers 148, 151, and 154, which are appropriate for modeling the signal with respect to time. In some implementations, three LSTM layers may be used to model the signal. In some implementations, each LSTM layer may include 832 cells and a 512 unit projection layer for dimensionality reduction. In some implementations, greater than three LSTM layers, including fewer cells, may alternatively be used. The output of the LSTM layers 148, 151, and 154 is provided to one or more deep neural network (DNN) layers 157.

The output 160 of the DNN 157 represents the output of the acoustic model. This output can represent probability scores for each of various acoustic model states, e.g., phonemes or hidden Markov model (HMM) states of phonemes. When the trained system is used to perform speech recognition, the output 160 indicates which phonemes are most likely, and this information is used for transcription of the utterance that corresponds to the audio data 103 and 106. For example, the information can be provided to a language model or other model to determine words and phrases that best correspond to the likely phonemes.

The layers that are included in one or more DNN layers 157 may be fully-connected and, in some implementations, may each have 1,024 hidden units. The other layers of the system 100 may be trained jointly with the acoustic model 139.

During training, the acoustic model 139 may be unrolled for 20 time steps for training with truncated back propagation through time (BPTT). In some implementations, the output state label may be delayed by one or more frames, as information about future frames may enhance the accuracy of predictions associated with a current frame. During training, output targets can be set as the output 160 and be used for backpropagation.

The system 100 includes a gated feedback mechanism 163. Generally, the gated feedback is only used during training. The gated feedback 163 provides the high level linguistic information of the output targets to the filter prediction stage 109. With the linguistic information, the filter prediction layer 109 can adjust subsequent filter parameters based on a previous phoneme. In some implementations, the gated feedback signal includes a confidence value. If the confidence value does not satisfy a threshold, then the gated feedback 163 does not influence the subsequent filter parameters. If the confidence value satisfies the threshold, then the gated feedback 163 does influence subsequent filter parameters. For example, if the threshold is 0.5, then with a confidence value of one, the filter prediction stage 109 would use output target 160 to adjust the filter parameters. If the confidence value was zero, then the filter prediction stage 109 would not use the output target 160 to adjust the filter parameters.

The system includes multitask learning layer 118. The multitask learning layer 118 includes DNN layers 166 and 169. The DNN layer 169 outputs the clean features 172 that is a de-noised output and is used by the system 100 during the training phase to generate clean log-mel features. As illustrated in FIG. 1, the multitask learning layer 118 receives data from the first LSTM layer 148. In order for the multitask learning layer 118 to process the received data, the data from the first LSTM layer 148 includes low levels of noise.

Figure 3:
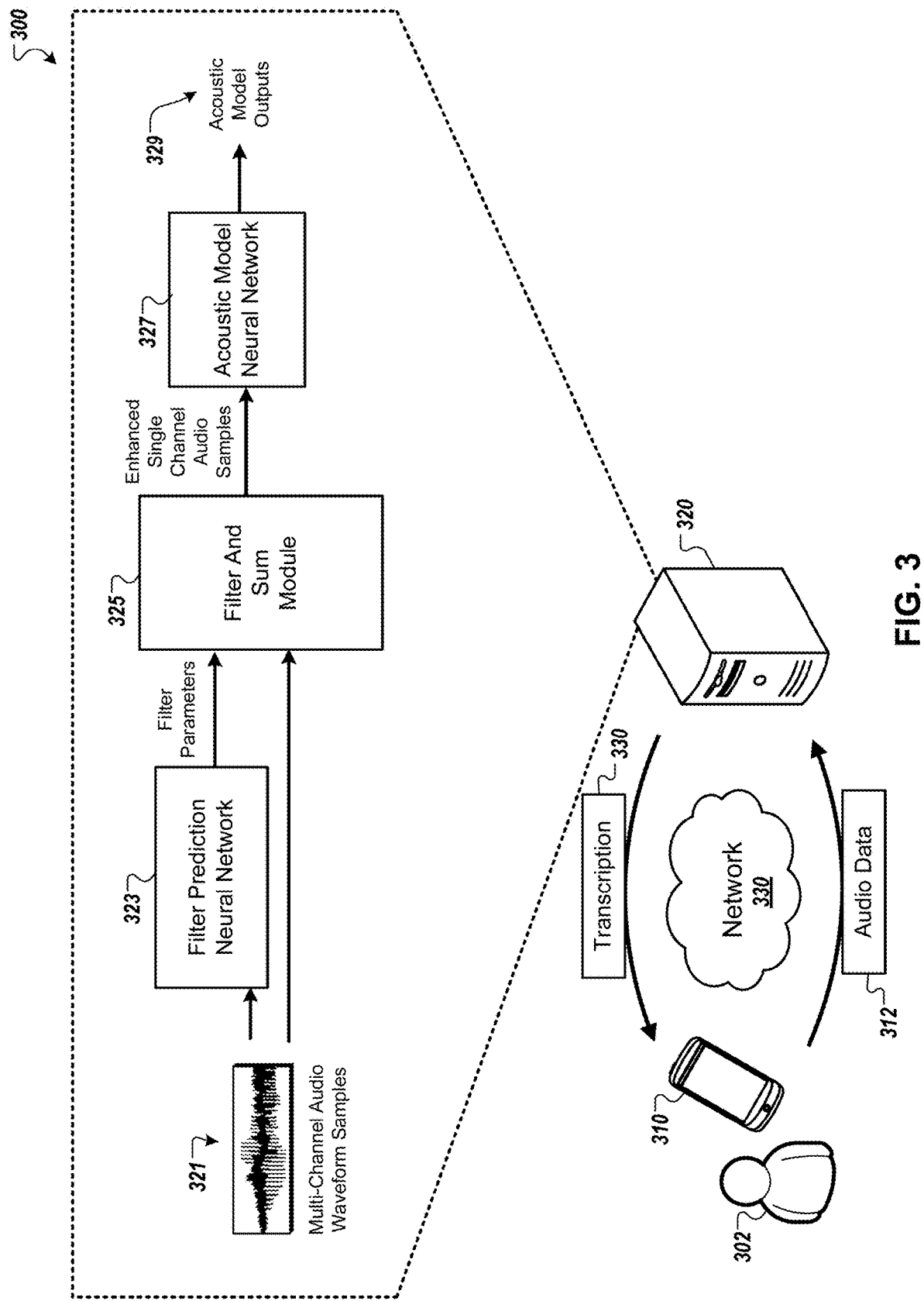
FIG. 3 illustrates an example of a system for speech recognition using neural networks.

FIG. 3 is a block diagram that illustrates an example system 300 for speech recognition using neural networks. The system 300 includes a client device 310, a computing system 320, and a network 330. In the example, the computing system 320 provides information about an utterance and additional information to neural networks 323. The computing system 320 uses output from the neural network 327 to identify a transcription for the utterance.

In the system 300, the client device 310 can be, for example, a desktop computer, laptop computer, a tablet computer, a wearable computer, a cellular phone, a smart phone, a music player, an e-book reader, a navigation system, or any other appropriate computing device. The functions performed by the computing system 320 can be performed by individual computer systems or can be distributed across multiple computer systems. The network 330 can be wired or wireless or a combination of both and can include the Internet.

In some implementations, the computing system 320 receives a set of audio waveform samples 321. These samples 321 can include samples for multiple audio channels, e.g., samples from audio detected by different microphones at the same time. The computing system 320 uses the samples 321 to generate filter parameters used for spatial filtering. The spatially filtered output is then provided to an acoustic model, e.g., neural network 327. The computing system 320 may determine a candidate transcription for the utterance based on at least an output of the neural network 327.

In the illustrated example, a user 302 of the client device 310 speaks, and the client device 310 records audio that includes the speech. The client device 310 records multiple channels of audio as the speech is detected. The client device 310 transmits the recorded audio data 312 for the multiple channels to the computing system 320 over the network 330.

The computing system 320 receives the audio data 312 and obtains audio waveform samples 321. For example, the computing system 320 may identify a set of audio waveform samples 321 that represent audio during a particular period of time, e.g., during a 25 ms period of the audio signal 312. These audio waveform samples may be similar to that which has been described above in reference to FIG. 1.

The computing system 320 may provide audio waveform samples 321 to a neural network 323 that acts as a filter prediction model. The neural network 323 may correspond to filter prediction stage 109, as described in association with FIG. 1. As such, the neural network 323 be a recurrent neural network that has been trained to generate filter parameters based on the audio waveform samples 321.

The computing system 320 may provide the output of the neural network 323 to a filter and sum module 325. The filter and sum module 325 may correspond to the filter and sum stage 112, as described in association with FIG. 1. As such, the filter and sum module 323 may apply filters with filter parameters received from the neural network 323 to the audio waveform samples 321 and sum the outputs.

In the illustrated example, the computing system 320 provides output of the filter and sum module 325 to the neural network 327. The neural network 327 has been trained to act as an acoustic model. For example, the neural network 327 indicates likelihoods that time-frequency feature representations correspond to different speech units when the time-frequency feature representations are output by filter module 325 and based on audio waveform samples 321. The neural network 327 may, for instance, correspond to the acoustic model stage 115, as described in association with FIG. 1 above. In some implementations, the neural network 327 may also include initial time convolution and post processing layers that initially process the outputs from the filter module 325.

The neural network 327 produces neural network outputs 329, which the computing system 320 uses to identify a transcription 330 for the audio signal 312. The neural network outputs 327 indicates likelihoods that the speech in a particular window, corresponds to specific phonetic units. In some implementations, the phonetic units used are phones or components of phones, also referred to a phonemes. In this example, the potential phones are referred to as $s_0 \ldots s_m$. The phones may be any of the various phones in speech, such as an "ah" phone, an "ae" phone, a "zh" phone, and so on. The phones $s_0 \ldots s_m$ may include all of the possible phones that may occur in the audio waveform samples 321, or fewer than all of the phones that may occur. Each phone can be divided into three acoustic states.

The neural network outputs 327 can provide predictions or probabilities of acoustic states given the data included in the audio waveform samples 322. The neural network outputs 329 can provide a value, for each state of each phone, which indicates the probability that acoustic feature vector $v_1$ represents the particular state of the particular phone. For example, for a first phone, so, the neural network outputs 329 can provide a first value that indicates a probability $P(s_0\_1 | X)$, which indicates a probability that the window $w_1$ includes the first acoustic state of the $s_0$ phone, given the set of input X, provided at the audio waveform samples 321. For a first phone, $s_1$, neural network outputs 329 can provide a second value indicating a probability $P(s_0\_2 | X)$, indicating a probability that the window $w_1$ includes the second acoustic state of the so phone, given the set of input, X, provided at the audio waveform samples 321. Similar outputs can be provided for all states of all of the phones $s_0 \ldots s_m$.

The computing system 320 provides different sets of samples 321 to the neural network 327 to receive predictions or probabilities of the acoustic states in different windows. The computing system 320 may provide a sequence of inputs, one after another representing different time windows of the utterance. By inputting each frame of audio data into the system in sequence, the computing system 320 obtains estimates of phonemes likely to have occurred during the utterance.

The computing system 320 may provide the neural network outputs 329 to, for example, weighted finite state transducers that approximate a hidden Markov model (HMM), which may include information about a lexicon indicating the phonetic units of words, a grammar, and a language model that indicates likely sequences of words. The output of the HMM can be a word lattice from which the transcription 330 may be derived. The computing system 320 then provides the transcription 330 to the client device 310 over the network 330.

Training of the neural networks 323, 327 can be performed as discussed above. Forward propagation through the neural network 327 produces outputs at an output layer of the neural network. The outputs may be compared with data indicating correct or desired outputs that indicate that the received time-frequency feature representation corresponds to a known acoustic state. A measure of error between the actual outputs of the neural network and the correct or desired outputs is determined. The error is then back-propagated through the neural network to update the weights within the neural network 327. The filter prediction neural network 323 can be jointly trained with the neural network 327.

This training process may be repeated for time-frequency feature representation data generated for audio waveform samples of multiple different utterances in a set of training data. During training, the frames selected for training can be selected randomly from a large set, so that frames from the same utterance are not processed consecutively.

In some implementations, the processing of the speech recognition system can be performed on the device that initially detects or records speech. For example, the processing described as being performed by the computing device 320 may be performed on the user device 310, without sending audio data over a network in some implementations.

Figure 4:
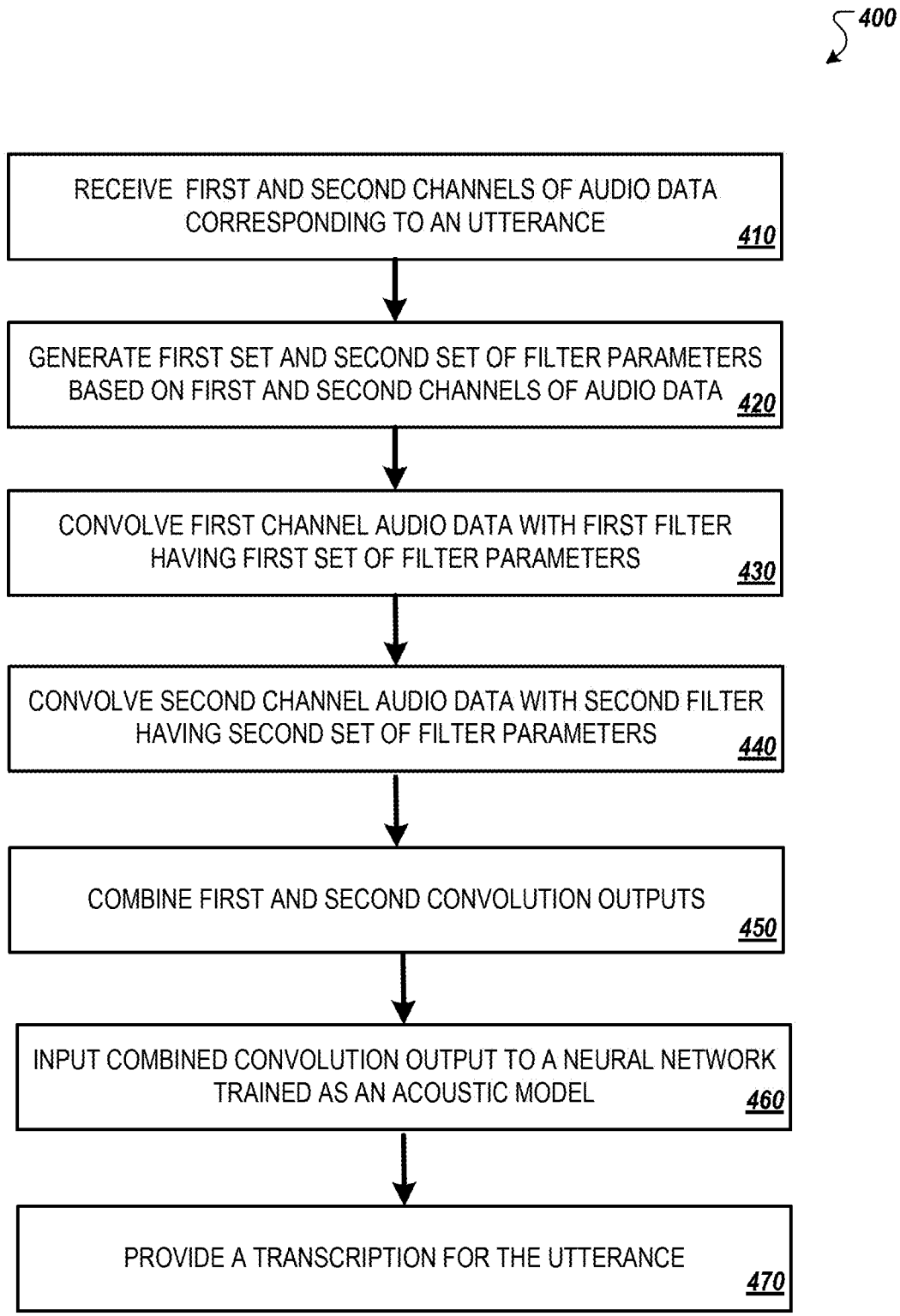
FIG. 4 illustrates an example process for adaptive audio enhancement for multichannel speech recognition.

FIG. 4 illustrates an example process 400 for neural network adaptive beamforming for multichannel speech recognition. In general, the process 400 receives an utterance and identifies, using a neural network, likely phonemes that correspond to the words of the utterance. The process 400 will be described as being performed by a computer system comprising at one or more computers, for example, the system 100 as shown in FIG. 1 or the system 300 as shown in FIG. 3.

The system receives a first channel of audio data corresponding to an utterance and a second channel of audio data corresponding to the utterance (410). In some implementations, the system receives the first and second channels through different microphones. For example, the system may have one microphone on a right side of the system and a second microphone that is about five centimeters from the first microphone on the right side of the system. When a user speaks, both microphones receive slightly different audio of the user's speech. In some implementations, the system may have more than two microphones that each receive audio data when a user speaks.

The system generates, using a trained recurrent neural network, (i) a first set of filter parameters based on the multiple channels of audio data and (ii) a second set of filter parameters based on the multiple channels of audio data (420). In some implementations, the trained recurrent neural network includes one or more LSTM layers. In some implementations, one LSTM layer receives audio data from each of the channels. For example, a first LSTM layer receives data from the first channel and the second channel. In some implementations, channel specific LSTM layers receive the output of the LSTM layer that receives data from each channel. In this instance, the first LSTM analyzes data from both channels for beamforming. In some implementations, the output of the channel specific LSTM layers are the filter parameters for the respective audio channel. In some implementations, each channel specific LSTM layer generates different filter parameters. In some implementations, the system segments the audio data into multiple frame and generated new and sometimes different filter parameters for each frame.

The system convolves the audio data for the first channel with a first filter having the first set of filter parameters to generate first convolution outputs (430). The system convolves the audio data for the second channel with a second filter having the second set of filter parameters to generate second convolution outputs (440). In some implementations where the system segments the audio data into different frames, the system convolves each frame of audio data with the respective parameters. In some implementations, the first and second filters are finite impulse response filters. In some implementations where the system receives multiple audio channels, the system filters each audio channel according to its respective filter parameters. In some implementations, the first and second filters perform both spatial and spectral filtering.

The system combines the first convolution outputs and the second convolution outputs (450). In some implementations, the system adds the first and second convolution outputs. In some implementations where the system receives multiple audio channels, the system adds the multiple convolution outputs from the multiple filters.

The system inputs the combined convolution outputs to a neural network trained as an acoustic model (460). In some implementations, the acoustic model identifies phonemes that correspond to the utterance. In some implementations, the neural network trained as an acoustic model include multiple LSTM layers, for example, three LSTM layers. In some implementations, the neural network trained as an acoustic model includes a convolutional layer and multiple hidden layers. In some implementations, the convolutional layer performs time convolution. In some implementations, the system does not perform frequency convolution. In some implementations, the system pools the output of the convolutional layer to generate a set of pooled values. In some implementations, the system provides the set of pooled values to the LSTM layers of the neural network trained as an acoustic model. The system provides a transcription for the utterance that is determined based at least on output that the neural network provides in response to receiving the combined convolution outputs (470).

In some implementations, the system provides a feedback mechanism from the output of the neural network trained as an acoustic model to the recurrent neural network. The feedback mechanism allows the system to use information of the previous phenome to influence the filter parameters. In some implementations, the feedback is gated in the sense that the feedback is only passed to the recurrent neural network if the confidence value for the phoneme satisfies a threshold.

In some implementations, the system includes a multitask learning stage that the system utilizes during the training phase. The multitask learning stage receives data from an LSTM layer of the neural network trained as an acoustic model, for example, the first LSTM layer. In some implementations, the multitask learning stage includes multiple deep neural network layers, for example, two deep neural network layers, and may include multiple hidden layers. The multitask learning stage generates clean features for use during the training phase of the neural network trained as an acoustic model and the recurrent neural network.

Figure 5:
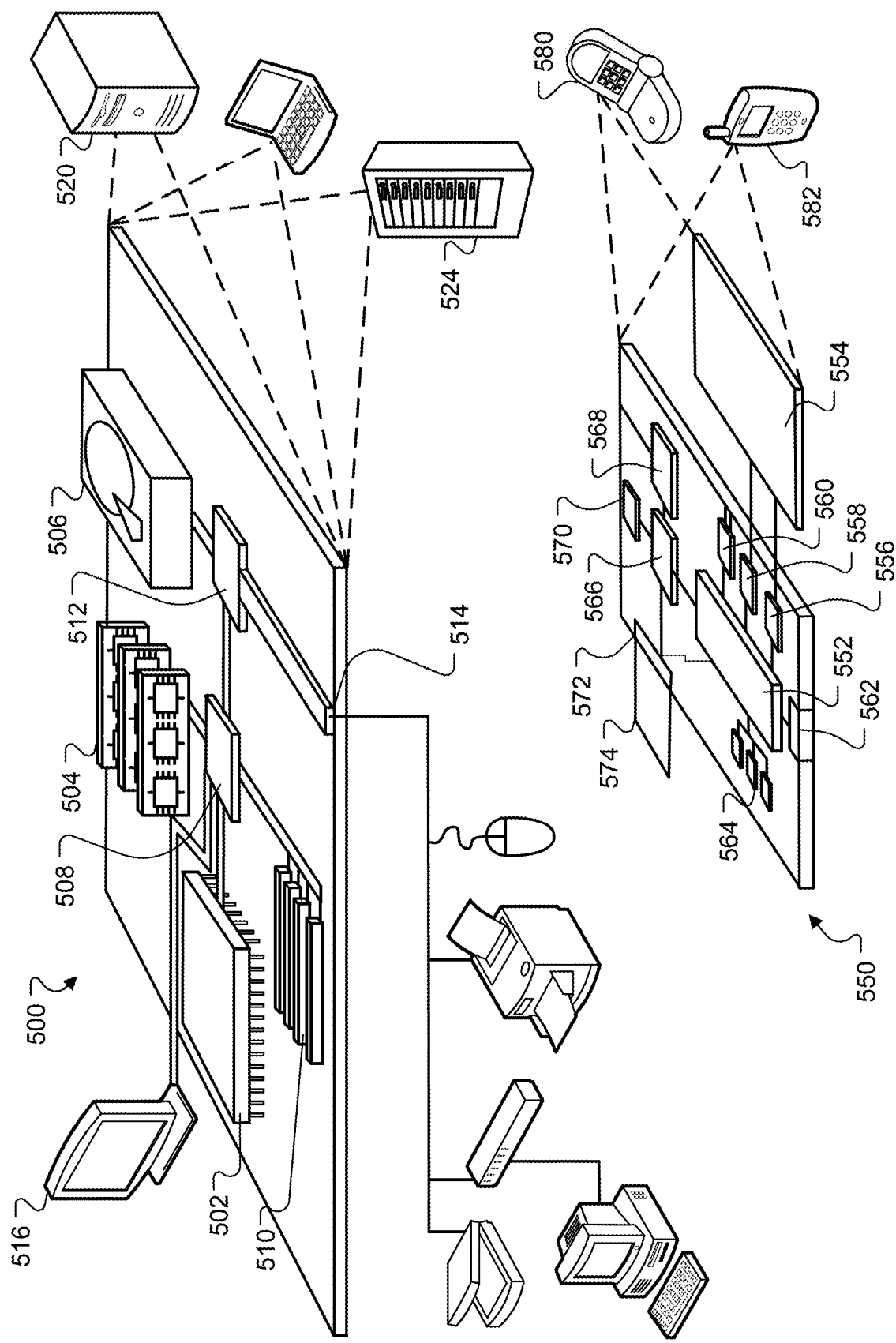
FIG. 5 illustrates an example of a computing device and a mobile computing device.

FIG. 5 shows an example of a computing device 500 and a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards. In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device, such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. That the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, Wi-Fi, or other such transceiver. In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
receiving a first channel of audio data corresponding to an utterance and a second channel of audio data corresponding to the utterance;
generating:
(i) a first set of filter parameters for a first filter based on the first channel of audio data; and
(ii) a second set of filter parameters for a second filter based on the second channel of audio data;
convolving:
(i) the first channel of audio data with the first filter having the first set of filter parameters, resulting in a first convolution output; and
(ii) the second channel of audio data with the second filter having the second set of filter parameters, resulting in a second convolution output;
combining the first convolution output and the second convolution output, resulting in a combined convolution output;

providing, as an input to a neural network trained as a speech recognition model, the combined convolution output; and providing a transcription for the utterance that is determined based at least on output that the neural network provides in response to receiving the combined convolution output.

2. The method of claim 1, wherein the neural network comprises one or more long short-term memory layers.

3. The method of claim 1, wherein the neural network comprises:
a first long short-term memory layer that receives (i) the first channel of audio data and (ii) the second channel of audio data; and
a second long short-term memory layer corresponding to the first channel and a third long short-term memory layer corresponding to the second channel, the second long short-term memory layer and the third long short-term memory layer each receiving the output of the first long short-term memory layer and providing a set of filter parameters for the corresponding channel.

4. The method of claim 3, wherein the long short-term memory layer layers have parameters that have been learned during a training process that jointly trains the long short-term memory layers and the second neural network that is trained as an acoustic model.

5. The method of claim 1, further comprising:
changing, or generating, new filter parameters for each input frame of audio data.

6. The method of claim 1, further comprising:
for each audio frame in a sequence of audio frames of the utterance, generating and a new set of filter parameters and convolving audio data for the frame with a filter with the new set of filter parameters.

7. The method of claim 1, wherein the first filter and the second filter are finite impulse response filters.

8. The method of claim 1, wherein the first filter and the second filter have different parameters.

9. The method of claim 1, wherein different microphone outputs are convolved with different filters.

10. The method of claim 1, wherein the first and second channels of audio data are first and second channels of audio waveform data for the utterance,
wherein the first and second channels of audio waveform data are recordings of the utterance by different microphones that are spaced apart from each other.

11. The method of claim 1, wherein the neural network comprises a convolutional layer, one or more long-short term memory layers, and multiple hidden layers.

12. The method of claim 11, wherein the convolutional layer of the neural network is configured to perform a time domain convolution.

13. The method of claim 11, wherein the neural network is configured such that output of the convolutional layer is pooled to generate a set of pooled values.

14. The method of claim 13, wherein the neural network is configured to input the pooled values to one or more long-short term memory layers within the neural network.

15. The method of claim 1, wherein the first and second filters are configured to perform both spatial and spectral filtering.

16. A system comprising:
one or more computers and one or more storage devices storing instructions that are operable, when executed by the one or more computers, to cause the one or more computers to perform operations comprising:
receiving a first channel of audio data corresponding to an utterance and a second channel of audio data corresponding to the utterance;
generating:
(i) a first set of filter parameters for a first filter based on the first channel of audio data; and
(ii) a second set of filter parameters for a second filter based on the second channel of audio data;
convolving:
(i) the first channel of audio data with the first filter having the first set of filter parameters, resulting in a first convolution output; and
(ii) the second channel of audio data with the second filter having the second set of filter parameters, resulting in a second convolution output;
combining the first convolution output and the second convolution output, resulting in a combined convolution output;
providing, as an input to a neural network trained as a speech recognition model, the combined convolution output; and
providing a transcription for the utterance that is determined based at least on output that the neural network provides in response to receiving the combined convolution output.

17. The system of claim 16, wherein the neural network comprises one or more long short-term memory layers.

18. The system of claim 16, wherein the neural network comprises:
a first long short-term memory layer that receives (i) the first channel of audio data and (ii) the second channel of audio data; and
a second long short-term memory layer corresponding to the first channel and a third long short-term memory layer corresponding to the second channel, the second long short-term memory layer and the third long short-term memory layer each receiving the output of the first long short-term memory layer and providing a set of filter parameters for the corresponding channel.

19. The system of claim 16, wherein the operations comprise:
changing, or generating, new filter parameters for each input frame of audio data.

20. A non-transitory computer-readable medium storing software comprising instructions executable by one or more computers which, upon such execution, cause the one or more computers to perform operations comprising:
receiving a first channel of audio data corresponding to an utterance and a second channel of audio data corresponding to the utterance;
generating:
(i) a first set of filter parameters for a first filter based on the first channel of audio data; and
(ii) a second set of filter parameters for a second filter based on the second channel of audio data;
convolving:
(i) the first channel of audio data with the first filter having the first set of filter parameters, resulting in a first convolution output; and
(ii) the second channel of audio data with the second filter having the second set of filter parameters, resulting in a second convolution output;
combining the first convolution output and the second convolution output, resulting in a combined convolution output;

providing, as an input to a neural network trained as a speech recognition model, the combined convolution output; and providing a transcription for the utterance that is determined based at least on output that the neural network provides in response to receiving the combined convolution output.

* * * * *